No. 720,782. PATENTED FEB. 17, 1903.
M. A. CHILCOTE.
BELT FASTENER.
APPLICATION FILED APR. 7, 1902.

NO MODEL.

WITNESSES:
F. V. Barron.
O. E. Murray.

INVENTOR
Maurice A. Chilcote
BY
Milo B. Stevens & Co.
ATTORNEYS.

THE NORRIS PETERS CO., PHOTO-LITHO., WASHINGTON, D. C.

UNITED STATES PATENT OFFICE.

MAURICE ADAMS CHILCOTE, OF WEST MILLGROVE, OHIO.

BELT-FASTENER.

SPECIFICATION forming part of Letters Patent No. 720,782, dated February 17, 1903.

Application filed April 7, 1902. Serial No. 101,732. (No model.)

*To all whom it may concern:*

Be it known that I, MAURICE ADAMS CHILCOTE, a citizen of the United States, residing at West Millgrove, in the county of Wood and State of Ohio, have invented certain new and useful Improvements in Belt-Fasteners; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to belt-fasteners, more particularly that class of fasteners in which two ends of a belt are secured together without perforation by means of two clamping members embraced by a link forming their pivots.

The object of my invention is to provide a simple device of this kind by which the ends of a belt may be securely held together.

Figure 1:
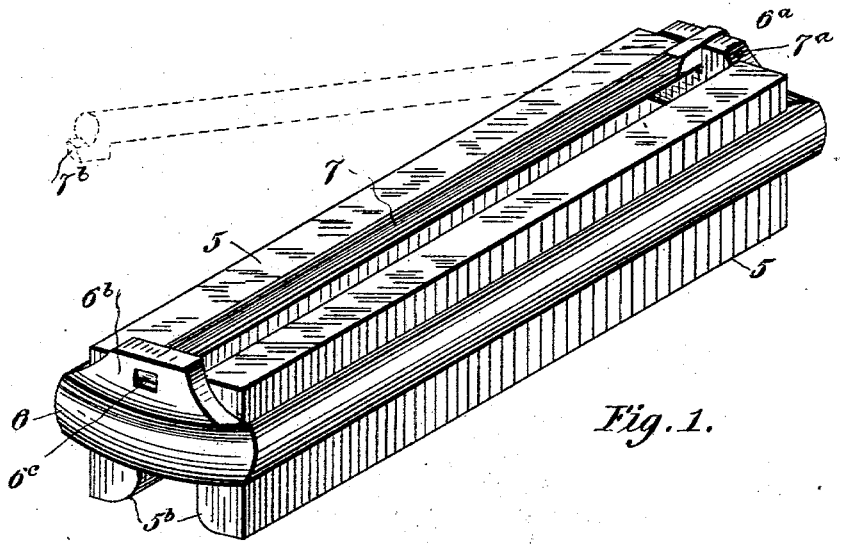
Figure 2:
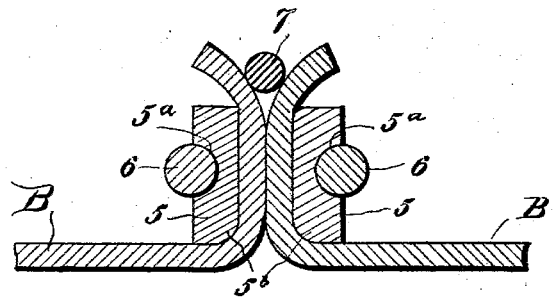

In the drawings, Figure 1 is a perspective view of the fastener. Fig. 2 is a longitudinal central section showing the belt in position.

Referring to the drawings, the two clamping members are indicated at 5, each having a longitudinal groove $5^a$ in which the link 6 lies, the same constituting pivot-points. The clamping members are rounded, as indicated at $5^b$, to prevent tearing of the belt B. At one end of the link 6 a projection $6^a$ is formed, in which a supplemental clamping member 7 is pivoted, as indicated at $7^a$. The said member 7 is provided with a catch $7^b$. The other end of the link is also provided with a projection $6^b$, having an opening $6^c$ for the purpose of holding the member 7 in engagement with the belt by means of the catch $7^b$. The member 7 fits in between the ends of the belt, its purpose being to assist holding it and prevent its slipping, which is the case at times when the belt gets wet.

To fasten the ends of a belt together, it is necessary only to place the same within the clamping members 5 and press down the member 7, which is made of spring-steel, until the catch $7^b$ enters the opening $6^c$. The belt will then be securely held and its liability to slip reduced a minimum.

In Fig. 1 the position of the supplemental clamping member 7 before the belt is clamped is shown in dotted lines.

Having thus described my invention, what is claimed as new, and desired to be secured by Letters Patent, is—

1. A belt-fastener comprising two clamping members, a link embracing the same and constituting pivot-points therefor, and a supplemental clamping member pivoted to said link and held thereby in engagement with the belt, substantially as shown and described.

2. A belt-fastener comprising two clamping members, a longitudinal groove in each member, a link embracing said clamping members and lying within said grooves, and a supplemental clamping member pivoted to said link and held thereby in engagement with the belt, substantially as shown and described.

3. A belt-fastener comprising two clamping members, a link embracing the same and constituting pivot-points therefor, a projection on one end of the link, a supplemental clamping member pivoted to said projection and having a catch on its end, a projection on the opposite end of the link, and an opening therein adapted to receive the catch, substantially as shown and described.

In testimony whereof I affix my signature in presence of two witnesses.

MAURICE ADAMS CHILCOTE.

Witnesses:
   M. W. MOFFETT,
   CHAS. E. RISSER.